April 15, 1958 C. A. FLANAGAN 2,830,828
TRAILER AND HITCH CONSTRUCTION
Filed Oct. 26, 1953 3 Sheets-Sheet 1
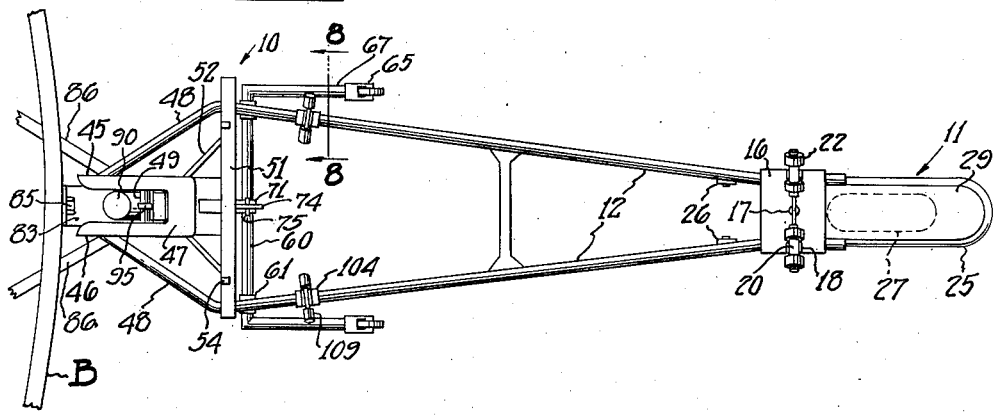
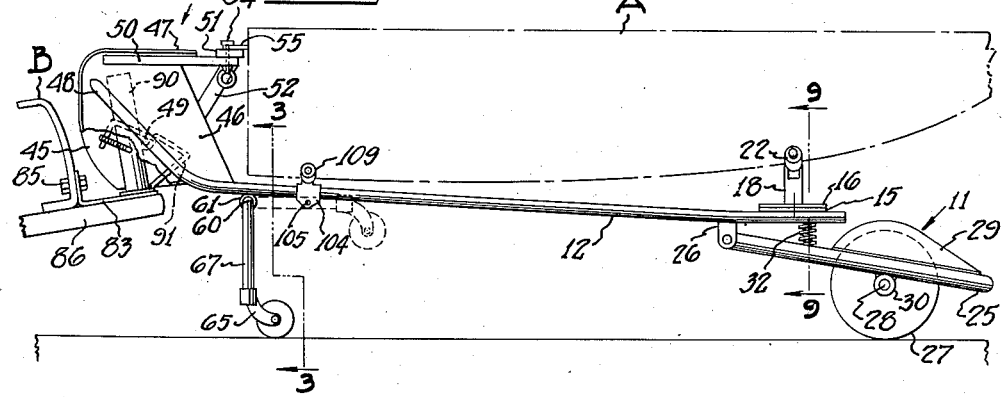
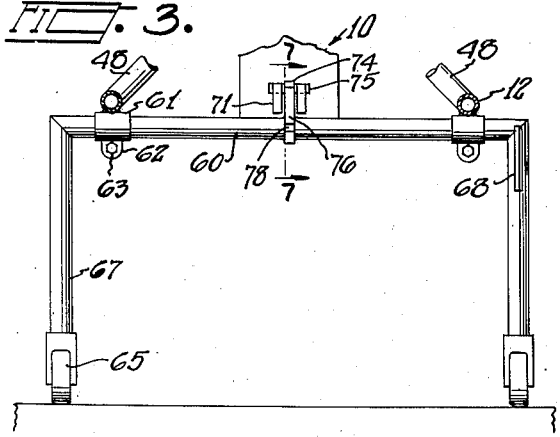
INVENTOR
CHESTER A. FLANAGAN
BY
Cook and Schermerhorn
ATTORNEYS April 15, 1958 C. A. FLANAGAN 2,830,828
TRAILER AND HITCH CONSTRUCTION
Filed Oct. 26, 1953 3 Sheets-Sheet 2
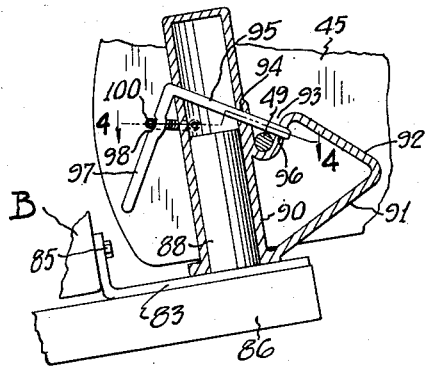
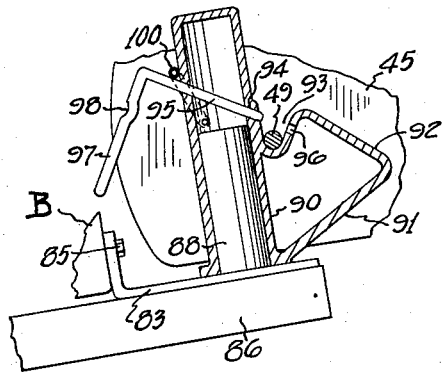
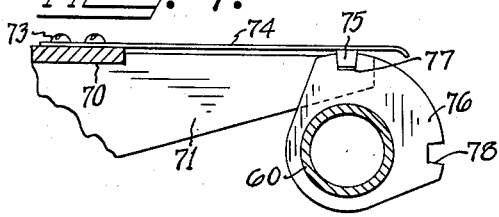
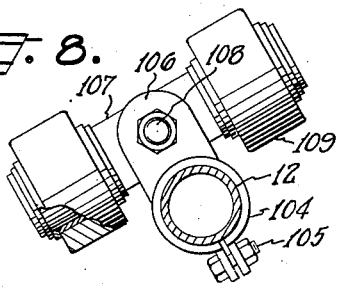
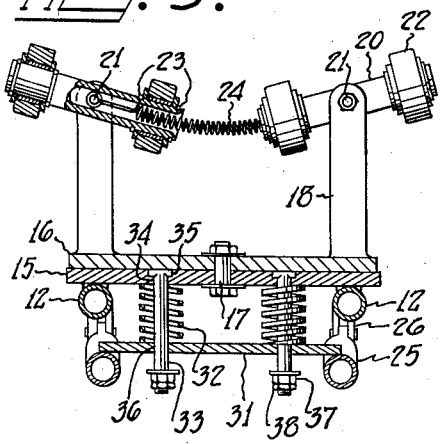
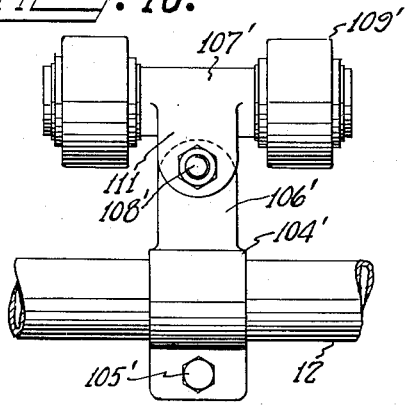
INVENTOR
CHESTER A. FLANAGAN
BY
Cook and Schermerhorn
ATTORNEYS

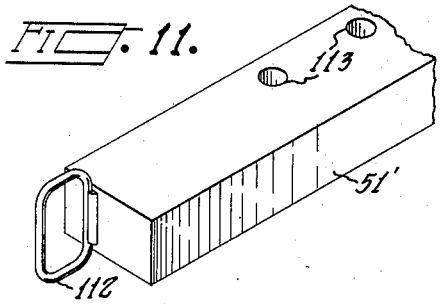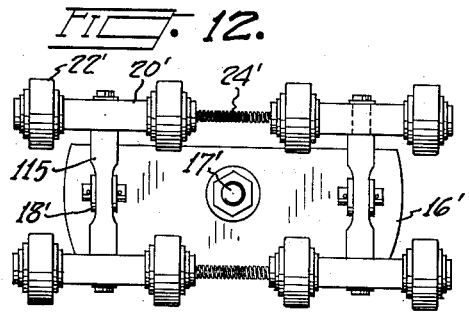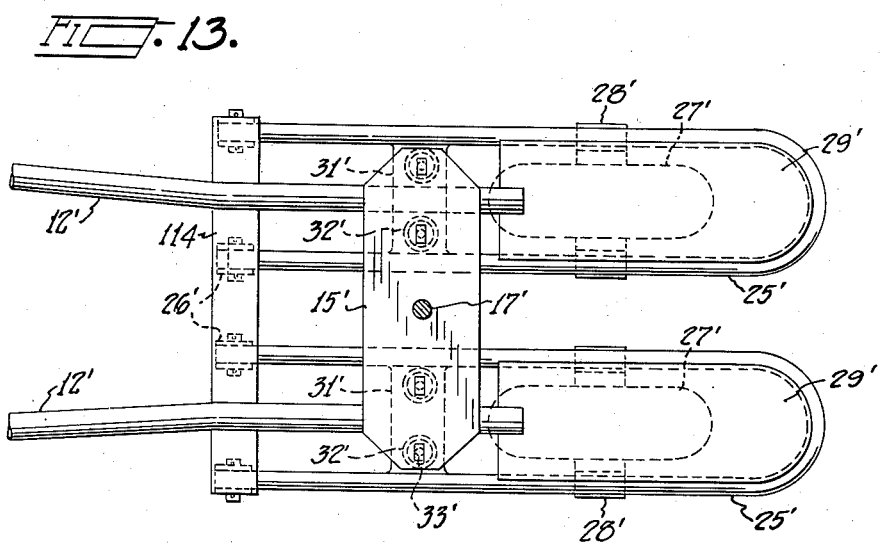

United States Patent Office 2,830,828
Patented Apr. 15, 1958

2,830,828

TRAILER AND HITCH CONSTRUCTION

Chester A. Flanagan, Portland, Oreg.

Application October 26, 1953, Serial No. 388,150

4 Claims. (Cl. 280—414)

This invention relates to improvements in a trailer and hitch construction.

A primary object of the invention is to provide a trailer having means to bank the trailer into a curve when a towing vehicle negotiates said curve.

Another object of the present invention is to provide an improved hitch construction for connection of a trailer to a towing vehicle.

Another object is to provide boat supporting means employing rollers conveniently to load and unload a boat or other load from the trailer, Another object is to provide supporting means rotatable on a vertical axis to rotate a boat to a convenient loading or unloading position.

Other objects are to provide a trailer which is simple in structure, light in weight, and durable in operation.

Still further objects are to be found in the details of construction of the various parts of the device, in their relationship, and in the mode of operation of the device as will hereinafter be fully described, The trailer of the present invention comprises, in general, a pair of spaced end assemblies. The rear end of the trailer comprises a cradle arrangement resiliently supported on a wheel suspension unit and the opposite end or front of the trailer comprises a frame structure having coupling means for providing a draft connection with a towing vehicle as well as caster units to support the front end of the trailer on the ground when the trailer is disconnected from the towing vehicle. The two end members are connected together by elongated spacer bars. The load carried thereby is supported on the cradle and rollers mounted on the longitudinal spacer bars, the rollers engaging the bottom of the load and permitting the load conveniently to be rolled on and off the trailer during a loading or unloading operation. The cradle is rotatably mounted on a supporting platform whereby the load and cradle can be rotated to an angular position relative to the trailer and the load then rolled off either side.

The hitch structure employs means to bank the trailer into a curve being negotiated by the towing vehicle. This is accomplished by an inclined post on the towing vehicle which is adapted to be connected to the coupling means and between guide means on the trailer. Connection between the two parts is made upwardly on the post, and, due to the inclination between the guide means of the post whereby the upper end thereof rotates in an orbit about the lower portion thereof when the towing vehicle negotiates a curve, the trailer will be caused to bank into the curve to prevent whipping of the trailer and its load.

The invention will be better understood and additional objects and advantages will become apparent from the following description taken in connection with the accompanying drawings which illustrate practical embodiments of the device. It is to be understood, however, that the invention may take other forms, and that all such modifications or variations within the scope of the appended claims which will occur to persons skilled in the art, are included in the invention.

In the drawings:

Figure 1 is a plan view of the present trailer showing the trailer unloaded and connected to a towing vehicle;

Figure 2 is a side elevational view of the trailer showing a boat carried thereon;

Figure 3 is a sectional view taken on the line 3—3 of Figure 2 showing the caster units on the front end of the trailer;

Figure 4 is a sectional view taken on the line 4—4 of Figure 5 showing the coupling and hitch means for connecting the trailer to a vehicle;

Figure 5 is a vertical sectional view through the coupling and hitch means showing the parts locked together;

Figure 6 is a view similar to Figure 5 but showing the parts unlocked;

Figure 7 is a sectional view taken on the line 7—7 of Figure 3;

Figure 8 is a sectional view taken on the line 8—8 of Figure 1 and showing one form of load engaging means;

Figure 9 is a sectional view taken on the line 9—9 of Figure 2 showing the resilient wheel suspension, and the cradle supported thereby for carrying one end of a load;

Figure 10 is an elevational view of a modified form of load engaging means;

Figure 11 is a perspective view of a modified form of frame member for anchoring a load thereto;

Figure 12 is a modified form of cradle arrangement for supporting one end of larger boats; and Figure 13 is a top plan view of a double wheel suspension arrangement for carrying larger boats.

Referring first to Figures 1 and 2, a preferred embodiment of the present invention comprises an end frame structure 10 and a wheel suspension mechanism 11 connected together in spaced relation by elongated spacer bars 12 which serve as longitudinal frame members. The spacer bars 12 may, if desired, be extensible so that the distance between the end frame structure 10 and wheel suspension mechanism 11 can be varied. The present trailer is illustrated herein for carrying a boat, but may as well be used for carrying a conventional trailer bed and box.

Secured to the rear portion of the bars 12, as by welding, is a supporting plate 15, Figure 9, upon which is seated a platform or plate 16. The platform 16 is rotatably mounted on the plate 15 by means of pin 17 and has a pair of upright bifurcated arms 18 secured thereto. Spindles or trunnions 20 pivotally mounted in the arms 18 by pins 21 carry rollers 22 held thereon by snap rings or the like 23. The rollers 22 form a cradle for supporting one end of the boat, and, as the spindles 20 are pivotally mounted in the arms 18, the rollers 22 automatically adjust themselves to the bottom contour of the boat. The spindles 20 may be tubular in shape to receive therein a tension spring 24 having its ends connected to the pins 21. The spring serves to hold the spindles 20 in substantially horizontal position for convenience in loading a boat thereon, although the rollers on the arms will automatically adjust themselves to the contour of the bottom of the boat without the use of spring 24.

The wheel suspension mechanism, best seen in Figures 2 and 9, comprises a fork 25 pivotally mounted in hanger brackets 26 secured to the underside of spacer bars 12. A single rubber tired wheel 27 is journaled on an axle 28 and may be covered by a splash guard 29. The ends of axle 28 are mounted in downwardly turned ears 30 secured to the fork 25. Also secured to the fork 25 is a plate 31, and between the plates 15 and 31 are vertical compression springs 32 which provide a resilient mounting between the fork 25 and the spacer bars 12. A bolt 33 extends through each of the springs 32 to limit the downward pivotal movement of the fork 25 relative to the spacer bars 12. The plate 15 has bores 34 and counterbores 35 for receiving the bolts 33 and their heads, respectively, and the lower plate 31 has bores 36 for receiving the lower ends of the bolts, the lower ends of the bolts being threaded for receiving nuts 37 and lock nuts 38.

The end frame structure 10 comprises a pair of spaced side plates 45 and 46 secured together at the top by a cross piece 47, the wall 46 being broken away in Figure 2. As best seen in the plan view of Figure 1, the longitudinal spacer bars 12 have angular end portions 48, and these end portions are secured to the side plates 45 and 46 to reinforce the same. Extending transversely of the plates 45 and 46 and secured thereto is a latch bar 49. A horizontal bar 50 is secured to the cross piece 47 and a portion thereof extends beyond the edges of the side plates to support a transverse frame member 51 which is reinforced by a pair of struts 52, Figure 1, secured to the side plates 45 and 46. Hook bolts 54 are secured to the upper side of member 51, and are engaged by handles 55 attached to the boat, Figure 2. Engagement of the handles 55 with the bolts 54 prevents sidewise or lengthwise movement of the boat relative to the trailer when being towed behind a towing vehicle.

As best seen in Figures 2 and 3, the member 60 is rotatably mounted in a pair of split sleeves 61 secured to the spacer bars 12. The sleeves 61 have ears 62 provided with apertures to receive a bolt 63 for reducing the sleeve diameter approximately to the diameter of the member 60, but permitting rotation of the member 60 in the sleeve. A pair of caster units 65 are mounted on the end frame 10 by means of upright legs 67 secured to the transverse frame member 60. One of the legs, Figure 3, has a small tube 68 welded thereto and a lever bar, not shown, is adapted to be inserted therein from the top for leverage to rotate the caster units to a horizontal position as shown in dotted lines in Figure 2, to be out of the way when the trailer is connected to a towing vehicle.

Figures 3 and 7 show a latch mechanism for positively holding the legs 67 and caster units 65 either in a vertical position or a horizontal position. A transverse plate 70 is secured to the plates 45 and 46 and a pair of plates 71 are secured to the plate 70 at right angles thereto as by welding. Mounted on the transverse plate 70 by screws 73 is a leaf spring 74 carrying a detent 75 on its lower side and adjacent its free end. The transverse rotatable member 60 has a latch plate 76 secured thereto and positioned on the member 60 so as to rotate under the detent 75. The latch plate 76 has a pair of notches 77 and 78 to receive the detent 75 and hold the member 60 and the caster units 65 in one of two positions. Engagement by the detent 75 of notch 78 holds the caster units horizontal, and engagement of the detent with notch 77 holds the caster units in ground engaging position. To release the detent from one of the notches, the free end of the spring is lifted upwardly, whereby the tubular member 60 can be rotated to a desired adjusted position.

A portion of the hitch or coupling means is carried by the towing vehicle and comprises a bracket 83, Figure 2, secured to the bumper B by a bolt 85. Further, to secure the bracket 83 to the vehicle, a pair of reinforcing rods 86 are secured between the brackets and the vehicle chassis, Figure 1. The bracket 83 is forged so that when it is installed on a towing vehicle, the outwardly extended leg is inclined slightly upwardly toward the towing vehicle. However, the vehicle bumper B may be normally inclined so that one leg of a right angle bracket will be inclined upwardly toward the towing vehicle, as shown in Figure 2, but, of course, the angle between the two legs of the bracket may be reduced if the bumper is vertical to obtain the desired inclination of the extended leg of the bracket.

Rigidly secured to the extended leg of the bracket is a stud or spindle 88, Figures 5 and 6. Rotatably mounted on the stud 88 is a tubular post 90 having as an integral part thereof, or secured thereto, a coupler bracket or hitch member 91. The bracket 91 has an upwardly inclined latch bar engaging ramp surface 92 and a recess or socket 93 formed therein. The recess 93 is adapted to receive the latch bar 49 which is secured between the two end plates 45 and 46 of the trailer frame 10, for establishing connection between a towing vehicle and the trailer.

A locking mechanism is provided for holding the latch bar 49 in the recess 93. As best seen in Figures 4, 5 and 6, the post 90 has apertures 94 for receiving a downwardly inclined slidable lock pin 95, one wall of the recess 93 also having an aperture 96 for receiving an end portion of the pin 95 when the latch bar 49 is held in locked position in the recess 93. The pin 95 has a downwardly extending arm 97 provided with a shallow recess 98. A spring 100, having both ends attached to the post 90 by means of a clip 101, seats in the recess 98 and urges the arm 97 and pin 95 toward locking position, Figure 5. The locking pin 95 is shown withdrawn in Figure 6 whereby the latch bar 49 can be removed from the recess 93. The spring 100 in Figure 6 has been removed from the recess 98 and frictionally engages the locking pin 95 to hold it in an unlocked position, but, of course, the spring may remain seated in the recess in both locking and unlocking positions, and to move the latch bar 49 into or out of the recess 93 the pin 95 may be manually held in a retracted position.

Referring to Figures 1 and 8, split sleeves 104 are mounted on the longitudinal spacer bars 12 adjacent the frame structure 10 and have apertures to receive bolts 105 for tightening the sleeves on the bars 12. Bifurcated arms 106 are secured to the sleeves 104 and spindles 107 are pivotally mounted on the arms 106 by pin 108. Rollers 109 held on the arms 107 by snap rings or the like provide a support for one end of the boat and will automatically adjust themselves to the bottom contour of the boat.

To provide a draft connection between the towing vehicle and the trailer, the trailer is brought forward relative to the vehicle with the coupler bracket 91 directed between the side plates 45 and 46 until the latch bar 49 rides over surface 92 of the coupling bracket 91 and seats in the recess 93. The locking pin 95, which is retracted while the two parts are being connected, is urged toward locking position by spring 100. To provide an easy connection between the trailer and the towing vehicle the caster units 65 are rotated to ground engaging position and the legs thereof are of a predetermined length so that when the trailer is wheeled up to the vehicle for connection the latch bar 49 will engage surface 92 of the coupler bracket 91. By a slight movement of the trailer toward the vehicle the latch bar 49 will slide over the surface 92 and into the recess 93 and hold the two parts together. Positive locking is accomplished by the locking pin 95. When the trailer is connected to the towing vehicle the caster units are raised to a horizontal position by first releasing the detent 75 from the notch 78 in the plate 76 and rotating the caster units to the position shown in dotted lines in Figure 2. As hereinbefore stated, the caster units are rotated by means of a lever inserted in a tube 68 on one of legs 67, Figure 3.

The banking effect of the trailer is accomplished by means of the inclined post 90 and its engagement with the side plates 45 and 46 which serve as guide and stabilizing means for the trailer. The space between the side plates 45 and 46 is only slightly greater than the outside diameter of the post 90. While the post 90 is free to rotate on stud 88, it will follow the inclination of the stud. When the towing vehicle is traveling in a straight line the post 90 holds the side plates 45 and 46 in a vertical position. However, when the towing vehicle negotiates a curve the stud 88 rotates therewith, relative to the trailer, causing the post 90 to be inclined laterally, relative to the trailer, in a direction toward the inside of the curve. The top portion of the post rotates in an orbit about the bottom portion thereof whereby the trailer frame is caused to bank into the curve. Utilizing a single wheeled unit permits the trailer readily to bank as desired, lateral stability being maintained at all times by the plates 45 and 46.

A boat carried on the trailer is seated on the rollers 22 and 109 and is held in anchored position thereon by engagement of the handles 55 with the hook bolts 54, Figure 2. To unload the boat it is necessary only to unhook the handles 55 from bolts 54 and roll the boat off the wheel suspension end. If desired, the stern of the boat or the end adjacent the frame end 10 of the trailer can be grasped and the boat rolled partially off the trailer until the center of gravity thereof is approximately over the rollers 22. Thereupon, the boat can be swung around at an angle to the trailer by means of the rotatable platform 16 and then rolled off the side of the trailer.

Figure 10 shows a modified form of boat supporting rollers which are mounted on the spacer bars 12 adjacent the end frame structure 10. This support comprises a split sleeve 104' having apertured ears to receive a bolt 105' for tightening the sleeve on the bars 12. The sleeve 104' has an upstanding lug 106', and a spindle 107' is pivotally mounted on the lug 106' by means of bifurcated arms 111 secured to the spindle 107'. A pin 108' holds the lugs 106' and arms 111 in pivotal relation. Rollers 109' are carried on the spindle 107' and the axis thereof is parallel to the axis of the bars 12.

Figure 11 shows a modified form of the upper transverse frame member 51 of the end frame structure 10. This member comprises a transverse member 51' having loops 112 on the ends thereof. The loops 112 may be engaged by straps for holding certain types of boats. Also, the member 51' may have apertures 113 for use in anchoring binding ropes therein.

As shown in Figures 12 and 13, the trailer may be provided with a dual wheel assembly to carry heavier boats. Forks 25' are pivotally mounted in hanger brackets 26' secured to a cross bar 114 on the spacer bars 12. Wheels 27' having splash guards 29' are journaled on axles 28', and springs 32' seated between upper plate 15' and a lower plate 31' provide a resilient mounting between the forks and spacer bars. A plate 16', Figure 12, is rotatably mounted on the plate 15' by a pin 17'. Bifurcated arms 18' carry cross arms 115 upon which are mounted spindles 20', the spindles 20' being pivotally mounted on the arms 115. Rollers 22' are mounted on spindles 20' for supporting the boat. This embodiment may employ a tension spring 24' connected between opposite pairs of arms 20' to hold them in position. The springs 32' provide a resilient mounting between the bars 12 and the fork 25' and the trailer is thus permitted to bank into the curve with both wheels remaining on the ground.

The present trailer and hitch construction is thereby intended to provide a trailer which is readily connected to a towing vehicle and which will follow directly therebehind without sidesway or whipping in the curves. The trailer may be of any length desired merely by extending bars 12 and is preferably constructed of light metal so that it is readily lifted by one man.

Having now described my invention and in what manner the same may be used, what I claim as new and desire to protect by Letters Patent is:

1. A trailer comprising a frame structure supported by a wheel unit for carrying a boat and the like behind a towing vehicle, hitch means on said towing vehicle for connecting said trailer to said towing vehicle, an inclined upstanding post on said hitch adapted to turn with said towing vehicle, socket means intermediate the ends of said post, a latch bar on said trailer adapted to engage said socket means to connect said trailer to said hitch means, and guide means on said trailer for receiving therebetween said inclined post, said inclined post engaging said guide means at points out of vertical alignment to bank said trailer when said towing vehicle negotiates a curve.

2. A trailer comprising a frame structure supported by a wheel unit for carrying a boat and the like behind a towing vehicle, hitch means on said towing vehicle for connecting said trailer to said towing vehicle, an inclined upstanding post on said hitch means adapted to turn with said towing vehicle, socket means intermediate the ends of said post, a latch bar on said trailer adapted to engage said socket means to connect said trailer to said hitch, a spring-pressed lock pin to hold said latch bar means in said socket, and guide means on said trailer for receiving therebetween said inclined post, said inclined post engaging said guide means at points out of vertical alignment to bank said trailer when said towing vehicle negotiates a curve.

3. A trailer hitch comprising an upstanding post, means for mounting said post on a vehicle for rotation about the axis of the post, a projection on one side of said post having a top ramp surface inclined upwardly toward said post, a transverse groove in said projection between the top of said ramp and said post, and a retractible pin on said post arranged to project across said groove.

4. A trailer and hitch construction comprising an upstanding post, means for mounting said post on a towing vehicle for rotation about the axis of the post, a projection on one side of said post having a top ramp surface inclined upwardly toward said post, a transverse groove in said projection between the top of said ramp and said post, a pair of laterally spaced vertical plates on said trailer adapted to receive said post and projection therebetween, a transverse horizontal latch bar extending between said plates adapted to rest in said groove, and a retractible latch pin on said post arranged to retain said bar in said groove.

References Cited in the file of this patent

UNITED STATES PATENTS

| | | |
|---|---|---|
| 1,378,619 | Robertson | May 17, 1921 |
| 1,557,195 | Clapp | Oct. 13, 1925 |
| 2,060,066 | Goin | Nov. 10, 1936 |
| 2,113,448 | Hewitt | Apr. 5, 1938 |
| 2,133,065 | Weber | Oct. 11, 1938 |
| 2,219,401 | Sampsell | Oct. 29, 1940 |
| 2,332,991 | Commire | Oct. 26, 1943 |
| 2,335,946 | Klaus | Dec. 7, 1943 |
| 2,431,245 | Haig et al. | Nov. 18, 1947 |
| 2,469,023 | White | May 3, 1949 |
| 2,471,096 | Colorigh | May 24, 1949 |
| 2,571,213 | Cunningham et al. | Oct. 16, 1951 |
| 2,595,453 | Gilmore | May 6, 1952 |
| 2,608,418 | Finlayon et al. | Aug. 26, 1952 |
| 2,636,745 | Cartwright | Apr. 28, 1953 |
| 2,713,951 | Davies | July 26, 1955 |